(12) United States Patent
Lin et al.

(10) Patent No.: US 8,660,024 B2
(45) Date of Patent: Feb. 25, 2014

(54) ESTIMATION METHOD TO EVALUATE A SYSTEM RELIABILITY OF A CLOUD COMPUTING NETWORK

(75) Inventors: Yi-Kuei Lin, Taipei (TW); Ping-Chen Chang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 662 days.

(21) Appl. No.: 12/926,468

(22) Filed: Nov. 19, 2010

(65) Prior Publication Data

US 2012/0023372 A1      Jan. 26, 2012

(30) Foreign Application Priority Data

Jul. 20, 2010   (TW) .............................. 099123748 A

(51) Int. Cl.
    *H04J 3/14*   (2006.01)
(52) U.S. Cl.
    USPC .......................................... 370/252; 370/248
(58) Field of Classification Search
    USPC ................................................ 370/252, 248
    See application file for complete search history.

(56) References Cited

U.S. PATENT DOCUMENTS

| | | | |
|---|---|---|---|
| 5,798,939 A * | 8/1998 | Ochoa et al. ................... | 700/286 |
| 8,121,042 B2 * | 2/2012 | Wang et al. ................... | 370/248 |
| 2009/0323539 A1 | 12/2009 | Wang et al. | |
| 2012/0113815 A1 * | 5/2012 | Zhang et al. ................... | 370/242 |

FOREIGN PATENT DOCUMENTS

| | | |
|---|---|---|
| TW | 2004 12805 A | 7/2004 |
| TW | 2010 23558 A1 | 6/2010 |

OTHER PUBLICATIONS

Office Action dated Aug. 30, 2013 issued in corresponding Taiwan application No. 099123748.

* cited by examiner

*Primary Examiner* — Albert T Chou
(74) *Attorney, Agent, or Firm* — Bacon & Thomas, PLLC

(57) ABSTRACT

An estimation method applies to evaluating a system reliability of a cloud computing network, and the steps thereof includes: providing a network model which sends data through at least two path between a cloud and a client; inputting a demand, a time constraint and a maintenance budget into the network model; providing plural capacity vectors corresponding to different states of the flow of the cloud computing network; selecting a first set of vectors from the capacity vectors for satisfying the demand and the time constraint; deleting the capacity vectors which do not meet the maintenance budget from the first set of vectors to form a second set of vectors; and computing an upper boundary of the system reliability based on the first set of vectors and an lower boundary of the system reliability based on the second set of vectors.

7 Claims, 3 Drawing Sheets

ESTIMATION METHOD TO EVALUATE A SYSTEM RELIABILITY OF A CLOUD COMPUTING NETWORK

BACKGROUND OF THE INVENTION (1) Field of the Invention

The invention relates to an estimation method to evaluate a system reliability, and especially relates to an estimation method considering the maintenance budget to evaluate a system reliability of a cloud computing network.

(2) Description of the Prior Art

The cloud computing network (CCN) is the most popular technique, so the performance evaluation is necessary. The cloud is structured by powerful servers that afford to compute a large number of data and provide the storage. The client could storage or utilize the data from the cloud through the CCN and the operating processes are implemented over the internet.

For keeping a good quality of service (QOS), the cloud should provide enough capacity to satisfy the client's demand. Another crucial factor to consider is the transmission time for the cloud computing network. While sending data from the cloud to the client, the transmission time or the delay time through the path should be the shortest.

Consequently, the factors to consider includes the path selection, the load capacity and the transmission time while estimating the performance of the cloud computing network. Otherwise, the maintenance action for guaranteeing the QOS of the cloud computing network is important, so the maintenance cost as the overall cost of restoring a network from the failed state back to the original state should be considerable, where the original state is the highest capacity of each edge. However, there are less records for providing the specific method with considering the maintenance cost to evaluate the performance of the cloud computing network.

SUMMARY OF THE INVENTION

Accordingly, the object of the invention is to provide an estimation method to evaluate a system reliability, which is the probability of the cloud computing network transmitting a specific demand with considering the maintenance budget and the time constraint.

In one aspect, the invention provides an estimation method to evaluate a system reliability of a cloud computing network. The estimation method is executed by a computer providing a network model. The computer is connected with the cloud computing network. The network model includes a plurality of edges, which are arranged to form at least two paths.

The steps of the method includes: storing an unit maintenance cost of each edge in the storage media, wherein the unit maintenance cost is defined as the cost of raising one unit capacity for each edge; inputting a demand, a time constraint and a maintenance budget into the network model; distributing the demand to the two paths for getting two allocated demands corresponding to the two paths; providing a first constraint into the network model, wherein the relational operators of the first constraint include the allocated demand, a load capacity of each path and the time constraint; transforming the load capacity of each path into a current capacity of each edge; arranging the current capacities to form a plurality of capacity vectors, wherein the capacity vectors are corresponding to different states of the flow of the cloud computing network; selecting a first set of vectors from the capacity vectors for satisfying the first constraint; providing a second constraint into the network model, the relational operators of the second constraint include the current capacity, the unit maintenance cost and the maintenance budget; selecting a second set of vectors from the first set of vectors for satisfying the second constraint; the operating unit computing a probability based on the first set of vectors to get a first probability, and computing the probability based on the second set of vectors to get a second probability; and outputting a spreadsheet for displaying the first probability and the second probability which contains an exact system reliability.

In an embodiment, the steps of selecting the first set of vectors includes: comparing the value between every two capacity vectors in the first set of vectors, and deleting the larger capacity vector of the two capacity vectors. And the steps of selecting the second set of vectors includes: comparing the value between every two capacity vectors in the second set of vectors, and deleting the larger capacity vector of the two capacity vectors.

In an embodiment, the steps of providing the second constraint includes: defining a maximal capacity of each edge; computing a difference between the current capacity and the maximal capacity for each edge; utilizing the operating unit reading the unit maintenance cost of each edge from the storage media, and the unit maintenance cost multiplied by the difference being a maintenance cost of each edge; adding the maintenance costs of the edges up to get a total maintenance cost of the cloud computing network; and defining the total maintenance cost smaller than or equal to the maintenance budget.

In an embodiment, the steps of providing the first constraint includes: defining each edge of the two paths having a lead time in relation to the length of the edge; for each path, adding the result of the allocated demand divided by the load capacity and the sum of the lead times up to get a transmission time; and defining the transmission time smaller than or equal to the time constraint.

The discrepancies between the invention and the conventional are the invention considering the maintenance cost for the cloud computing network, considering the data delivery through multiple paths and estimating the upper boundary and lower boundary of the system reliability by a bounding approach.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
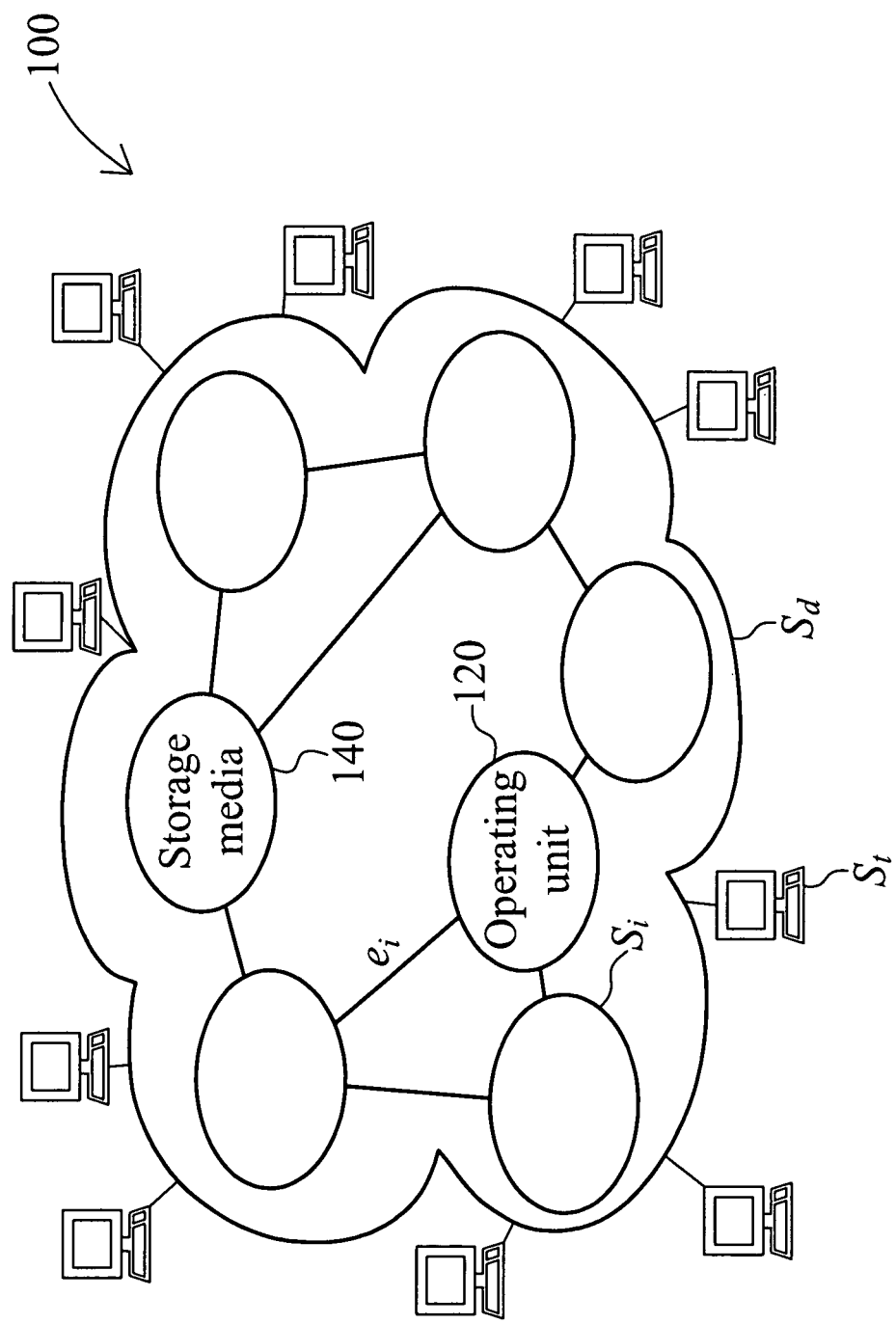
FIG. 1 is a schematic view of the cloud computing network.

Refer to FIG. 1 for a schematic view of the cloud computing network (CCN). The cloud computing network 100 includes a cloud $S_d$ and a client $S_t$. The cloud $S_d$ includes an operating unit 120 and a storage media 140. The client $S_t$ includes a computer connected with the operating unit 120 and the storage media 140 through the cloud computing network.

Figure 2:
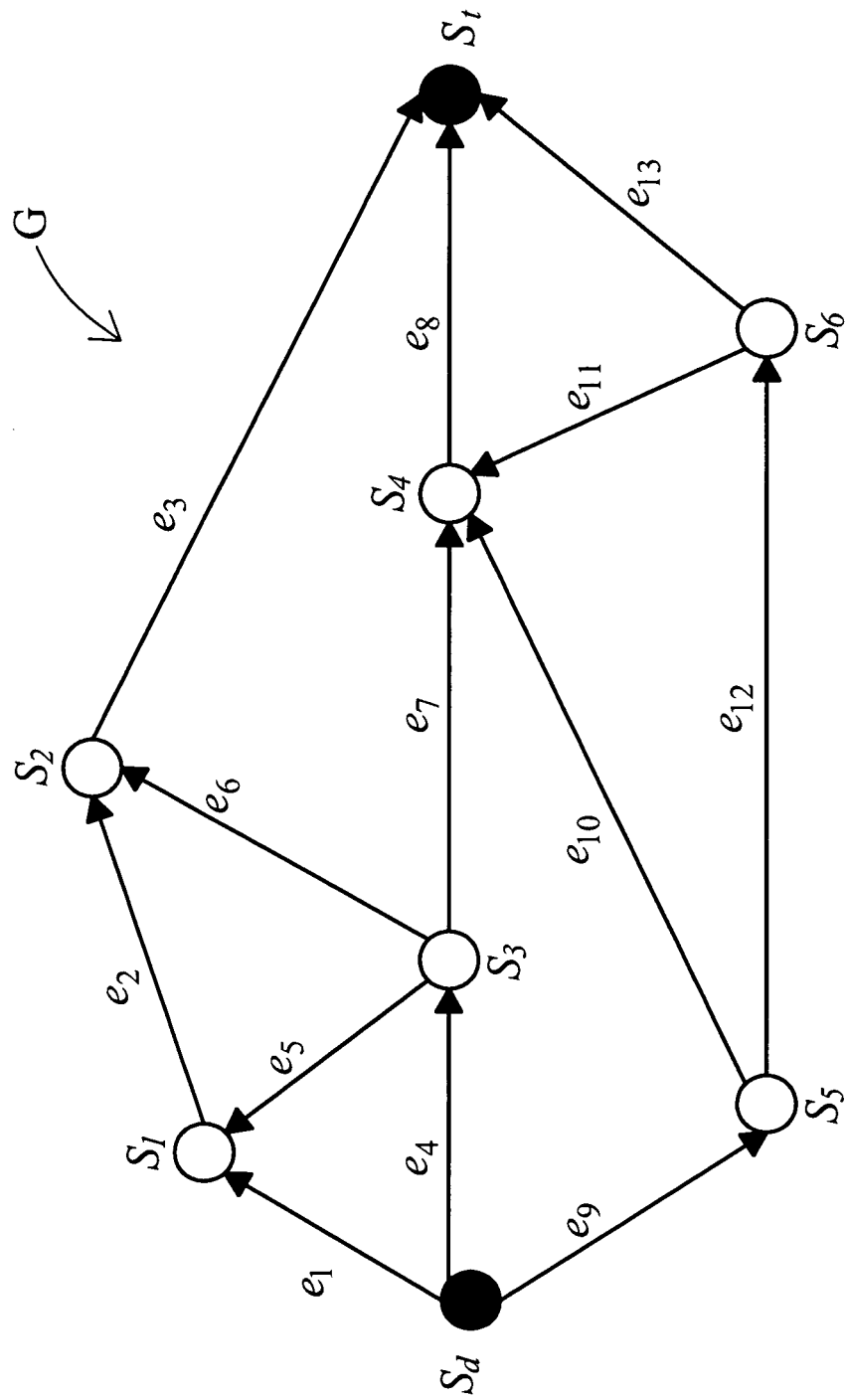
FIG. 2 is a schematic view of the network model for the cloud computing network.

Refer to FIG. 2 for a schematic view of the network model for the cloud computing network 100. The network model G is able to be disposed on any node $S_i$ such as the computer or the network of the client $S_t$ of FIG. 1 and utilized to evaluate a system reliability of the cloud computing network 100. The system reliability is regarded as the performance index.

The network model G includes a plurality of nodes $S_i$ and a plurality edges $e_i$. The node $S_i$ is such as the server or the switch, and the edge is such as the physical line, the fiber optic or the coaxial cable. The is node $S_i$ includes the cloud $S_d$ and the client $S_t$, and the cloud is regarded as the source of the cloud computing network and the client is regarded as the sink of the cloud computing network. Each edge $e_i$ connects two nodes $S_i$ and the edges $e_i$ are arranged to form at least two paths $P_j$. For example, the edges $e_1$, $e_2$, $e_3$ are arranged to form a first path, and the edges $e_9$, $e_{12}$, $e_{13}$ are arranged to form a second path. Each path $P_j$ is a minimal path, and $P_j$ denotes the jth minimal path for j=1, 2, . . . , m, where m is the numbers of the minimal path. The minimal path is an ordered set of the edges $e_i$ between the source and the sink and no loops is in the ordered set.

Let the network model G=(S, E, W, C, L) be a CCN, wherein S represents the set of the nodes, E={$e_i$|i=1, 2, . . . , n} represents the set of the edges, W={$W_i$|i=1, 2, . . . , n} with $W_i$ represents the maximal capacity of the edges $e_i$, which represents an optimal state of the CCN, C={$c_i$|i=1, 2, . . . , n} with $c_i$ represents the per unit maintenance cost of the edges $e_i$, and L={$l_i$|i=1, 2, . . . , n} with $l_i$ represents the lead time of the edges $e_i$, which is process time or transmission time for data deliver through the edge $e_i$ so valued in relation to the length of the edge $e_i$.

The capacity of each edge $e_i$ is stochastic for the cloud computing network 100. Hence, each edge includes multiple possible capacities. The capacity in the invention is called as the flow (giga bits per second, Gbps) of the cloud computing network 100. A capacity vector X=($x_1, x_2, \ldots, x_n$) is defined as different states of the flow of the network model G wherein $x_i$ represents the current capacity of edge $e_i$. The unit maintenance cost is defined as the cost of raising one unit capacity for each edge $e_i$.

Vector operations are defined as follows:
Y≥X ($y_1, y_2, \ldots, y_n$)≥($x_1, x_2, \ldots, x_n$): $y_i$≥$x_i$ for each i=1, 2, . . . , n;
Y>X ($y_1, y_2, \ldots, y_n$)>($x_1, x_2, \ldots, x_n$): Y≥X and $y_i$>$x_i$ for at least one i.

For keeping a good quality of service (QOS), the cloud computing network 100 must maintain the state to satisfy the demand d. When the state of the cloud computing network 100 is for just satisfying the exact demand d, the cloud computing network 100 must be restored from the original state to an optimal state. Meanwhile, each edge $e_i$ has a maximal capacity. Consequently, total maintenance cost is defined as the overall cost for restoring the cloud computing network 100 from the original state back to the optimal state.

The maintenance cost of each edge $e_i$ is computed with the restored capacity. In the cloud computing network 100, the total cost to maintain the edges $e_i$ from the state X is $$TC(X) = \sum_{e_i \in P_j} c_i(W_i - x_i), \quad (1)$$

where $c_i(W_i - x_i)$ is the maintenance cost for each edge $e_i$ on the minimal path $P_j$ to restore from the current capacity $x_i$ to the corresponding maximal capacity $W_i$. For instance, the current capacity vector X=(1,0,1,1,0,0,1,1), the maximal capacity vector W=(3,3,3,1,2,4,5,4), and the per unit maintenance cost C=(25,15,25,40,20,15,40,30). If the current capacities $x_1$, $x_3$, $x_4$, $x_7$, and $x_8$ are on the minimal path, the total maintenance cost to restore from the state X is TC(X)=$c_1(W_1-x_1)+c_3(W_3-x_3)+c_4(W_4-x_4)+c_7(W_7-x_7)+c_8(W_8-x_8)$=25(3−1)+25(3−1)+40(1−1)+40(5−1)+30(4−1)=350.

In an embodiment, only the edges appearing in two minimal paths are necessary to be maintained. The following constraint states that the total maintenance cost can not exceed the maintenance budget B, $$\sum_{e_i \in P_j} c_i(W_i - x_i) \le B. \quad (2)$$

For each minimal path $P_j$={$e_{j1}, e_{j2}, \ldots, e_{jn_j}$}, j=1, 2, . . . , m, the maximal capacity of the minimal path $P_j$ is $$\min_{1 \le k \le n_j} (W_{jk}),$$

where $n_j$ is the number of the edges in the minimal path $P_j$. Similarly, under the state X, the capacity of the minimal path $P_j$ is $$\min_{1 \le k \le n_j} (x_{jk}).$$

The transmission time to send the demand d units of data through the minimal path $P_j$ under the state X, $\lambda(d, X_j)$, is $$\text{lead time of } P_j + \left\lceil \frac{d}{\text{the capacity of } P_j} \right\rceil = \sum_{k=1}^{n_j} l_{jk} + \left\lceil \frac{d}{\min\limits_{1 \le k \le n_j} x_{jk}} \right\rceil, \quad (3)$$

where ⌈x⌉ is the smallest integer such that ⌈x⌉≥x.

Figure 3:
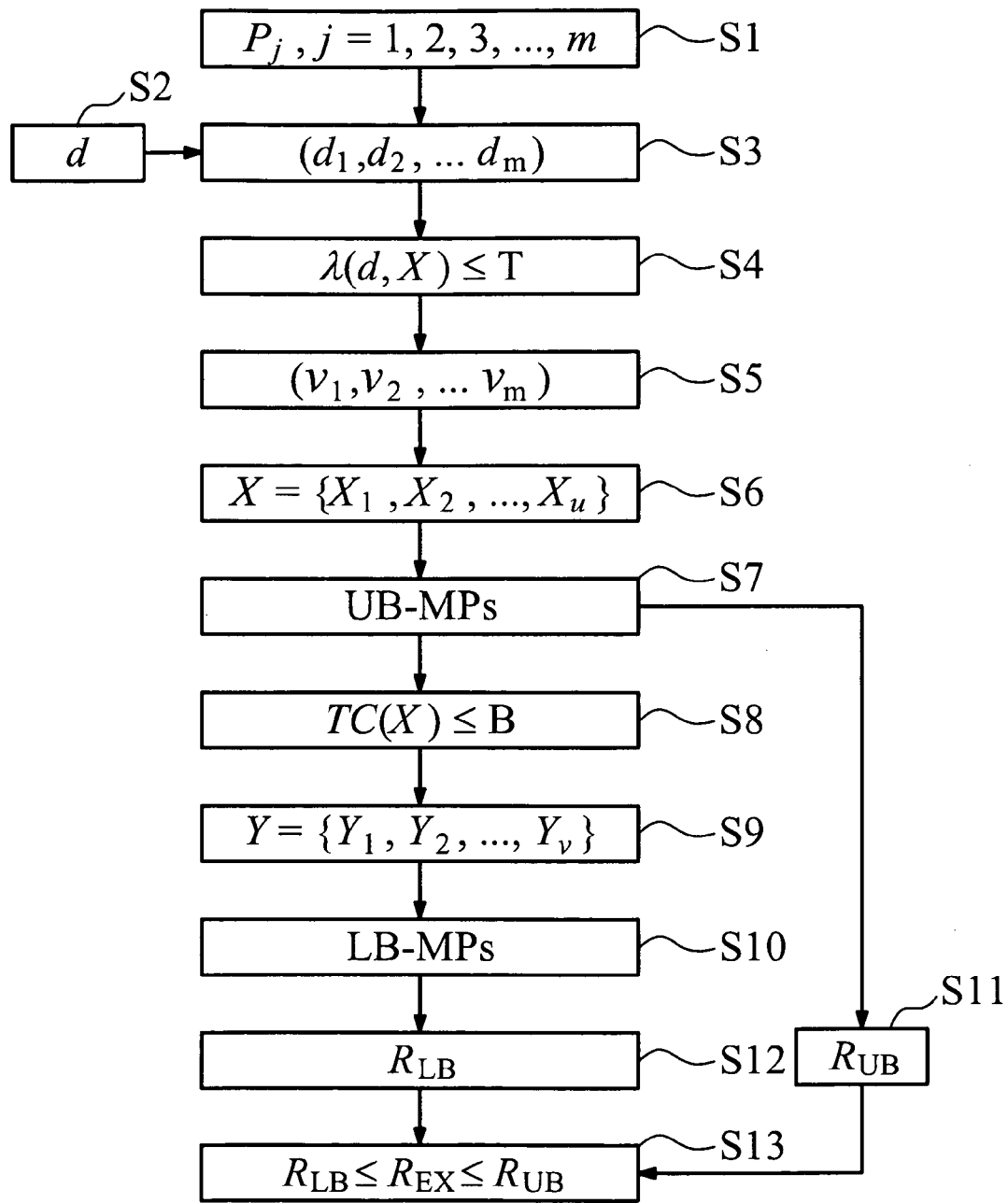
FIG. 3 is a chart showing an estimation method to evaluate a system reliability of a cloud computing network.

Refer to FIG. 3 for a chart showing an estimation method to evaluate the system reliability of the cloud computing network. The unit maintenance cost $c_i$ of each edge $e_i$ is stored in the storage media 140. The steps of the estimation method are described as below.

Step (S1): select a plurality of paths $P_j$ for synchronously transmitting data;

Step (S2): input a demand d into the network model;

Step (S3): distribute the demand d to at least two paths $P_1$ and $P_2$ for getting two allocated demands $d_1$ and $d_2$ respectively corresponding to two paths $P_1$ and $P_2$, wherein the sum of the allocated demands is the demand $d_1+d_2=d$;

Step (S4): input a time constraint T to provide a first constraint $\lambda(d,X) \le T$ into the network model G, wherein the first constraint includes the relational operators of the allocated demand $d_1$ (or $d_2$), the load capacity $v_1$ (or $v_2$) of each path $P_1$ (or $P_2$) and the time constraint T;

According to said formula (3), the steps of providing the first constraint $\lambda(d,X) \le T$ further includes: define each path $P_j = \{e_{j1}, e_{j2}, \ldots, e_{jn_j}\}$, for j=1, 2, ..., n, the maximal capacity of the path $P_j$ is $$\min_{1 \le k \le n_j} (W_{jk}),$$

where $n_j$ is the number of edges in the path $P_j$; add the result of each allocated demand $d_1$ (or $d_2$) divided by the load capacity $v_1$ (or $v_2$) in the corresponding path $P_1$ (or $P_2$) and the lead time $l_{1k}$ (and $l_{2k}$) up to obtain the transmission time $\lambda(d,X)$; and define that the transmission time $\lambda(d,X)$ is smaller than or equals to the time constraint T;

Step (S5): compute the load capacity $v_1$ (or $v_2$) of the path $P_1$ (or $P_2$) according to the first constraint and the allocated demand $d_1$ (or $d_2$), and get a minimal capacity $v_1$ (or $v_2$) in the preferred embodiment;

Step (S6): transform a current capacity $x_i$ of each edge $e_i$ from the capacity; arrange the current capacities $x_i$ to form a plurality of capacity vectors $X=\{X_1, X_2, \ldots, X_u\}$, the capacity vector X corresponding to different state of the flow of the network model G;

Step (S7): compare the value between every two capacity vectors X, and delete the larger capacity vector of the two capacity vectors X, wherein the other capacity vectors X are called as the upper boundary vectors UB-MPs, the upper boundary vectors UB-MPs form a first set of vectors $\Theta_{UB}$, and the upper boundary vectors UB-MPs of the first set of vectors $\Theta_{UB}$ satisfy the first constraint $\lambda(d,X) \le T$, in other words, the first set of vectors $\Theta_{UB}$ is the set of the minimal capacity vectors for completely transmitting the demand d within T;

Step (S8): input a maintenance budget B into the network model G to provide a second constraint $TC(X) \le B$, wherein the second constraint includes the relational operators of the current capacity $x_i$, the unit maintenance cost $c_i$ and the maintenance budget B;

According to said formula (1) and (2), the steps of providing the second constraint $TC(X) \le B$ includes: define a maximal capacity $W_i$ of each edge $e_{j1}$ (or $e_{j2}$); compute a difference between the current capacity $x_i$ and the maximal capacity $W_i$ for each edge $e_{j1}$ (or $e_{j2}$); utilize the unit maintenance cost $c_i$ multiplied by the difference to get a maintenance cost C(X) of each edge $e_i$; add the maintenance costs C(X) of the edges $e_{j1}$ and $e_{j2}$ up to get a total maintenance cost TC(X); and define that the total maintenance cost TC(X) is smaller than or equals to the maintenance budget B;

Step (S9): delete the capacity vector, unsatisfying the maintenance budget $TC(X) \le B$, from the first set of vectors $\Theta_{UB}$ to select the capacity vectors $Y=\{Y_1, Y_2, \ldots, Y_v\}$;

Step (S9): compare the value between every two capacity vectors Y, and delete the larger capacity vector of the two capacity vectors Y, the other capacity vectors Y are called as the lower boundary vectors LB-MPs, and the lower boundary vectors LB-MPs form a second set of vectors $\Theta_{LB}$;

Step (S11): performing a probability computing based on the first set of vectors $\Theta_{UB}$ by the operating unit 120 to get a first probability $R_{UB}$, wherein the cloud computing network 100 under the state of the first set of vectors $\Theta_{UB}$, without considering the maintenance cost, is able to transmit the d unit of data from the cloud $S_d$ to the client $S_t$ within T, so the first probability $R_{UB}$ is the upper boundary of the system reliability;

Step (S12): performing the probability computing based on the second set of vectors $\Theta_{LB}$ by the operating unit 120 to get a second probability $R_{LB}$, wherein the lower boundary vectors LB-MPs of the second set of vectors $\Theta_{LB}$ satisfy the time constraint $\lambda(d,X) \le T$ and the maintenance budget $TC(X) \le B$, so the second probability $R_{LB}$ is the lower boundary of the system reliability;

Step (S13): output a spreadsheet from an output unit of the cloud computing network 100 for displaying the first probability $R_{UB}$ and the second probability $R_{LB}$, which contains an exact value $R_{EX}$ of the system reliability.

Under the state with considering the maintenance budget B, the demand d must be transmitted from the cloud $S_d$ to the client $S_t$ within T, so a plurality of paths $P_j$ are simultaneously utilized for data delivery. If a system supervisor evaluates the value $R_{Ex}$ of the system reliability, the estimative values of the system reliability for the upper boundary vectors UB-MPs and the lower boundary vectors LB-MPs ought to be firstly evaluated, and the upper boundary vectors UB-MPs and the lower boundary vectors LB-MPs satisfy $\lambda(d,X) \le T$ and TC(X) B. The upper boundary $R_{UB}$ of the system reliability and the lower boundary $R_{LB}$ of the system reliability are respectively calculated according to the upper boundary vectors UB-MPs and the lower boundary vectors LB-MPs, so the exact value $R_{Ex}$ of the system reliability is between two boundaries $R_{UB}$ and $R_{LB}$.

By the way, it is less easy to evaluate the exact value $R_{Ex}$ of the system reliability in the cloud computing network. For evaluating the exact value $R_{Ex}$ of the system reliability, the capacity vectors $X_j$, which are unsatisfying the maintenance budget B, ought to be deleted from the first set of vectors $\Theta_{UB}$, so the minimal capacity vectors EX-MPs, which are satisfying the maintenance budget B and the time constraint T, are obtained. However, the group $D_j=\{X|X \ge X_j\}$ must be deleted, so the capacity vector is also deleted, wherein the group is composed of the capacity vectors X lager than or equal to the capacity vector $X_j$, and the capacity vector might be involved in the capacity vectors X and simultaneously be satisfying the maintenance budget B and the time constraint T.

For example, if giving two upper boundary vectors satisfying the time constraint, $X_1=(1,1,0,0)$ and $X_2=(0,0,2,1)$ and supposing the maximal vector W=(2,3,2,1) and the unit maintenance cost C=(5,3,2,6), the total maintenance cost $TC(X_1)=21$ and $TC(X_2)=19$ are calculated according to the formula (1). If supposing that the maintenance budget B is 20, the capacity vector $X_1$ and the group $D_1=\{X|X\geq X_1\}$ must be deleted, so the capacity vector simultaneously satisfying the maintenance budget B and the time constraint T might be also deleted, wherein the capacity vector $X_1$ exceeds the maintenance budget B, and the group $D_1=\{X|X\geq X_1\}$ is composed of the capacity vectors lager than or equal to the capacity vector $X_1$. For instance, the capacity vector is $X_3=(2,1,0,0)$, whose total maintenance cost $TC(X_3)=16$, and the capacity vector is $X_4=(1,2,0,0)$, whose total maintenance cost $TC(X_4)=18$. Particularly, the capacity vectors $X_3$ and $X_4$ are not involved in the group $D_2=\{X|X\geq X_2\}$, so the capacity vectors $X_3$ and $X_4$ are able to be the minimal capacity vectors EX-MPs, wherein the group $D_2=\{X|X\geq X_2\}$ is composed of the capacity vectors lager than or equal to the capacity vector $X_2$. Therefore, it is difficult to list all the minimal capacity vectors simultaneously satisfying the maintenance budget B and the time constraint T, so the upper boundary vectors UB-MPs and the lower boundary vectors LB-MPs are utilized to be defined as the possible range of the exact value $RE_X$ of the system reliability in the invention.

In an embodiment, each edge $e_i$ in the cloud computing network 100 is composed of a plurality of optical carriers, where each optical carrier provides two capacity, 1 Gbps (giga bits per second) and 0 bps. The optical carriers are provided by multiple suppliers, so the capacity of the different edge has various probability distribution. The capacity $x_i$, the lead time $l_i$ and the unit maintenance cost $c_i$ of each edge $e_i$ are shown as Table 1.

For the case that the cloud $S_d$ has to send 5 giga bits of data to the client $S_t$ through two disjoint paths $P_1=\{e_1, e_2, e_3\}$ and $P_2=\{e_9, e_{12}, e_{13}\}$ within 8 seconds and under the maintenance budget of 620. It implies that the cloud computing network 100 is falling to the failed state when the capacity level is less than 5 Gb. The results are summarized in Table 2.

Four UB-MPs are generated, $X_1=(3,3,3,0,0,0,0,0,0,0,0,0,0)$, $X_2=(2,2,2,0,0,0,0,0,1,0,0,1,1)$, $X_4=(1,1,1,0,0,0,0,0,2,0,0,2,2)$, and $X_6=(0,0,0,0,0,0,0,0,3,0,0,3,3)$. Given the group $D_1=\{X|X\geq X_1\}$, $D_2=\{X|X\geq X_2\}$, $D_4=\{X|X\geq X_4\}$, and $D_6=\{X|X\geq X_6\}$, then the upper bound $R_{UB}$ of system reliability is $Pr\{D_1 \cup D_2 \cup D_4 \cup D_6\}=0.99582313$ by the RSDP (recursive sum of disjoint products) algorithm. Furthermore, because the total maintenance cost $TC(X_1)=635$ exceeds B, the capacity vector $X_1$ is unable to enter the first set of vectors $\Theta_{LB}$, so the first set of vectors is $\Theta_{LB}=\{X_2, X_4, X_6\}$. Hence, the lower bound $R_{LB}$ of the system reliability is $Pr\{D_2 \cup D_4 \cup D_6\}=0.99342953$.

In Table 2, the minimal capacity $(v_1,v_2)$ is calculated by the formula (4). Suppose $P_1=\{e_1, e_2, \ldots, e_q\}$ and $P_2=\{e_{q+1}, e_{q+2}, \ldots, e_{q+r}\}$, so $$\sum_{k=1}^{q} l_k + \left\lceil \frac{d_1}{v_1} \right\rceil \leq T \text{ and } \sum_{k=q+1}^{q+r} l_k + \left\lceil \frac{d_2}{v_2} \right\rceil \leq T. \qquad (4)$$

For instance, the allocated demand, $(d_1,d_2)=(5,0)$, if 5 giga bits of data is send within 8 seconds through the path $P_1$, the lead time $l_k$ added up is 2+1+3=6; according to the formula (4), the equation, $6+(5/v_1)\leq T=8$, is listed, and the integer $v_1=3$ is obtained. In other words, there are enough capacity for each edge of the path $P_1$ transmitting at least 3 unit of data. Similarly, $d_2=0$, there are no data through the path $P_2$, so the capacity of the path $P_2$ is able to be set as zero.

TABLE 1

The edge data of FIG. 2.

| Edge | Cost | Lead time (sec) | Capacity (Gbps) | | | | | | |
|---|---|---|---|---|---|---|---|---|---|
| | | | 0 | 1 | 2 | 3 | 4 | 5 | 6 |
| $e_1$ | 25 | 2 | 0.001947 | 0.024187 | 0.120178 | 0.298561 | 0.370860 | 0.184267 | 0.000000[a] |
| $e_2$ | 15 | 1 | 0.000275 | 0.004820 | 0.035202 | 0.137126 | 0.300467 | 0.351134 | 0.170977 |
| $e_3$ | 30 | 3 | 0.001544 | 0.020460 | 0.108424 | 0.287284 | 0.380598 | 0.201689 | 0.000000 |
| $e_4$ | 35 | 4 | 0.006785 | 0.067421 | 0.251243 | 0.416112 | 0.258439 | 0.000000 | 0.000000 |
| $e_5$ | 20 | 2 | 0.006785 | 0.067421 | 0.251243 | 0.416112 | 0.258439 | 0.000000 | 0.000000 |
| $e_6$ | 25 | 2 | 0.001947 | 0.024187 | 0.120178 | 0.298561 | 0.370860 | 0.184267 | 0.000000 |
| $e_7$ | 20 | 1 | 0.000275 | 0.004820 | 0.035202 | 0.137126 | 0.300467 | 0.351134 | 0.170977 |
| $e_8$ | 40 | 3 | 0.020571 | 0.163516 | 0.433256 | 0.382657 | 0.000000 | 0.000000 | 0.000000 |
| $e_9$ | 35 | 3 | 0.001544 | 0.020460 | 0.108424 | 0.287284 | 0.380598 | 0.201689 | 0.000000 |
| $e_{10}$ | 25 | 2 | 0.005636 | 0.059738 | 0.237425 | 0.419392 | 0.277809 | 0.000000 | 0.000000 |
| $e_{11}$ | 45 | 4 | 0.020571 | 0.163516 | 0.433256 | 0.382657 | 0.000000 | 0.000000 | 0.000000 |
| $e_{12}$ | 30 | 2 | 0.000275 | 0.004820 | 0.035202 | 0.137126 | 0.300467 | 0.351134 | 0.170977 |
| $e_{13}$ | 25 | 1 | 0.001544 | 0.020460 | 0.108424 | 0.287284 | 0.380598 | 0.201689 | 0.000000 |

[a]The edge does not provide this capacity.

TABLE 2

Results of the case B = 620.

| $(d_1, d_2)$ | $(v_1, v_2)$ | X | $X_j \in \Theta_{UB}$ or not | Total Cost | $X_j \in \Theta_{LB}$ or not | Remark |
|---|---|---|---|---|---|---|
| (5, 0) | (3, 0) | $X_1 = (3, 3, 3, 0, 0, 0, 0, 0, 0, 0, 0, 0, 0)$ | Yes | 635 | No | exceed budget |
| (4, 1) | (2, 1) | $X_2 = (2, 2, 2, 0, 0, 0, 0, 0, 1, 0, 0, 1, 1)$ | Yes | 615 | Yes | — |
| (3, 2) | (2, 1) | $X_3 = (2, 2, 2, 0, 0, 0, 0, 0, 1, 0, 0, 1, 1)$ | No | — | — | $X_3 \geq X_2$ |
| (2, 3) | (1, 2) | $X_4 = (1, 1, 1, 0, 0, 0, 0, 0, 2, 0, 0, 2, 2)$ | Yes | 595 | Yes | — |
| (1, 4) | (1, 2) | $X_5 = (1, 1, 1, 0, 0, 0, 0, 0, 2, 0, 0, 2, 2)$ | No | — | — | $X_5 \geq X_4$ |
| (0, 5) | (0, 3) | $X_6 = (0, 0, 0, 0, 0, 0, 0, 0, 3, 0, 0, 3, 3)$ | Yes | 575 | Yes | — |

In another case that the maintenance budget B is tightened to be 600, the results concluded in table 3 shows that the first set of vectors $\Theta_{UB}=\{X_1, X_2, X_4, X_6\}$ and the second set of vectors $\Theta_{LB}=\{X_4, X_6\}$. Then, the upper boundary and the lower boundary of the system reliability are respectively $R_{UB}=0.99582313$ and $R_{LB}=0.95075108$.

TABLE 3

Results of the case B = 600.

| $(d_1, d_2)$ | $(v_1, v_2)$ | X | $X_j \in \Theta_{UB}$ or not | Total Cost | $X_j \in \Theta_{LB}$ or not | Remark |
|---|---|---|---|---|---|---|
| (5, 0) | (3, 0) | $X_1 = (3, 3, 3, 0, 0, 0, 0, 0, 0, 0, 0, 0)$ | Yes | 635 | No | exceed budget |
| (4, 1) | (2, 1) | $X_2 = (2, 2, 2, 0, 0, 0, 0, 0, 1, 0, 0, 1, 1)$ | Yes | 615 | No | exceed budget |
| (3, 2) | (2, 1) | $X_3 = (2, 2, 2, 0, 0, 0, 0, 0, 1, 0, 0, 1, 1)$ | No | — | — | $X_3 \geq X_2$ |
| (2, 3) | (1, 2) | $X_4 = (1, 1, 1, 0, 0, 0, 0, 0, 2, 0, 0, 2, 2)$ | Yes | 595 | Yes | — |
| (1, 4) | (1, 2) | $X_5 = (1, 1, 1, 0, 0, 0, 0, 0, 2, 0, 0, 2, 2)$ | No | — | — | $X_5 \geq X_4$ |
| (0, 5) | (0, 3) | $X_6 = (0, 0, 0, 0, 0, 0, 0, 0, 3, 0, 0, 3, 3)$ | Yes | 575 | Yes | — |

The estimation method in said embodiments utilizes a bounding approach to obtain the upper boundary vectors UB-MPs and the lower bounds vectors LB-MPs. The upper boundary vector UB-MPs is the minimal capacity vector satisfying the demand d and the time constraint T, and the lower boundary vector LB-MPs is the minimal capacity vector satisfying the demand d, the time constraint T and the maintenance budget B. Then, the upper boundary and the lower boundary of the system reliability are respectively computed by RSDP algorithm base on the upper boundary vectors UB-MPs and the lower bounds vectors LB-MPs.

The estimation method to evaluate a system reliability is with considering the maintenance budget and the time constraint, so the performance of evaluating the cloud computing network conforms the requirement of the industry. The electronic products, the system and the web applied in the cloud computing network are able to utilize the estimation method of the invention to add the function of the performance estimation. In particular, the lower boundary $R_{LB}$ is also able to be determined from the steps of deriving the upper boundary $R_{UB}$ since the first set of vector include the second set of vector, $\Theta_{UB} \supset \Theta_{LB}$. That is, it is unnecessary to take additional steps for computing the lower boundary $R_{LB}$ but getting the lower boundary $R_{LB}$ in part of the steps of evaluating the upper boundary $R_{UB}$. Based on the system reliability, the system supervisors can conduct the sensitive analysis to investigate the most important part in a large CCN.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An estimation method to evaluate a system reliability of a cloud computing network, executed by a computer providing a network model, wherein the computer is connected with a storage media and an operating unit through the cloud computing network, and the network model comprises a plurality of edges arranged to form at least two paths, the estimation method comprising steps of:

storing an unit maintenance cost of each of the edges in the storage media, wherein the unit maintenance cost is defined as the cost of raising one unit capacity for each of the edges;

inputting a demand, a time constraint and a maintenance budget into the network model;

distributing the demand to the two paths for getting two allocated demands corresponding to the two paths;

providing a first constraint into the network model, wherein the relational operators of the first constraint comprise the allocated demand, a load capacity of each of the paths and the time constraint;

transforming the load capacity of each of the paths into a current capacity of each of the edges;

arranging the current capacities to form a plurality of capacity vectors, wherein the capacity vectors are corresponding to different states of the flow of the cloud computing network;

selecting a first set of vectors from the capacity vectors for satisfying the first constraint;

providing a second constraint into the network model, wherein the relational operators of the second constraint comprise the current capacity, the unit maintenance cost and the maintenance budget;

selecting a second set of vectors from the first set of vectors for satisfying the second constraint;

the operating unit performing a probability computing based on the first set of vectors to get a first probability, and performing the probability computing based on the second set of vectors to get a second probability; and outputting a spreadsheet for displaying a range between the first probability and the second probability, wherein the range includes an unknown value representing an exact value of the system reliability.

2. The estimation method to evaluate the system reliability of the cloud computing network of claim 1, wherein the computer, the storage media and the operating unit are on the cloud computing network.

3. The estimation method to evaluate the system reliability of the cloud computing network of claim 1, wherein the steps of selecting the first set of vectors comprises:

comparing the value between every two capacity vectors in the first set of vectors, and deleting the larger capacity vector of the two capacity vectors.

4. The estimation method to evaluate the system reliability of the cloud computing network of claim 1, wherein the steps of selecting the second set of vectors comprises:

comparing the value between every two capacity vectors in the second set of vectors, and deleting the larger capacity vector of the two capacity vectors.

5. The estimation method to evaluate the system reliability of the cloud computing network of claim 1, wherein the steps of providing the second constraint comprises:

defining a maximal capacity of each of the edges;

computing a difference between the current capacity and the maximal capacity for each of the edges;

utilizing the operating unit reading the unit maintenance cost of each of the edges from the storage media, and the unit maintenance cost multiplied by the difference being a maintenance cost of each of the edges;

adding the maintenance costs of the edges up to obtain a total maintenance cost of the cloud computing network; and defining the total maintenance cost smaller than or equal to the maintenance budget.

6. The estimation method to evaluate the system reliability of the cloud computing network of claim 1, wherein the steps of providing the first constraint comprises:

defining each of the edges in the two paths having a lead time in relation to the length of the edge;

for each of the paths, adding the result of the allocated demand divided by the load capacity and the sum of the lead times up to get a transmission time; and defining the transmission time smaller than or equal to the time constraint.

7. The estimation method to evaluate the system reliability of the cloud computing network of claim 1, wherein the network model comprises a plurality of nodes, each of the edges is connected between two nodes, the nodes comprises a source and a sink, and each of the paths is an ordered set of the edges between the source and the sink and no loops is in the ordered set.

* * * * *